(12) United States Patent
Labelle

(10) Patent No.: US 8,920,039 B2
(45) Date of Patent: Dec. 30, 2014

(54) TANDEM ROLLING BEARINGS WITH OPEN CAGE

(71) Applicant: Schaeffler Technologies AG & Co. KG, Herzogenaurach (DE)

(72) Inventor: Chad Labelle, Troy, MI (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 14/055,368

(22) Filed: Oct. 16, 2013

(65) Prior Publication Data

US 2014/0140650 A1    May 22, 2014

Related U.S. Application Data

(60) Provisional application No. 61/727,258, filed on Nov. 16, 2012.

(51) Int. Cl.
 *F16C 33/41* (2006.01)
 *F16C 33/40* (2006.01)
 *F16C 19/18* (2006.01)
 *F16C 33/48* (2006.01)

(52) U.S. Cl.
 CPC ............. *F16C 33/405* (2013.01); *F16C 19/182* (2013.01); *F16C 33/416* (2013.01); *F16C 33/418* (2013.01); *F16C 33/485* (2013.01)
 USPC ........................................................ 384/531

(58) Field of Classification Search
 USPC .......................... 384/523, 526, 531, 504, 544
 See application file for complete search history.

(56) References Cited

U.S. PATENT DOCUMENTS

| 4,330,160 | A |   | 5/1982  | Stolz et al.           |
|-----------|---|---|---------|------------------------|
| 4,560,291 | A |   | 12/1985 | Bonengel et al.        |
| 4,702,627 | A | * | 10/1987 | Pollastro ........ 384/526 |
| 5,137,376 | A | * | 8/1992  | Gutsche et al. ... 384/531 |
| 5,387,041 | A | * | 2/1995  | Lederman ........ 384/531 |
| 6,783,279 | B2|   | 8/2004  | Wilm et al.            |
| 6,957,919 | B2|   | 10/2005 | Kern et al.            |
| 2009/0074341 | A1 | | 3/2009 | Takada et al.          |
| 2010/0189386 | A1 | | 7/2010 | Dizlek et al.          |
| 2010/0296761 | A1 | | 11/2010| Bohr et al.            |
| 2011/0033149 | A1 | | 2/2011 | Bohr et al.            |

OTHER PUBLICATIONS

Schaeffler Technologies AG & Co. KG Engineering drawing for Part No. F-234977.06; dated prior to Nov. 1, 2012 (admitted prior art).
Schaeffler Technologies AG & Co. KG Engineering drawing for Part No. Z-559629; dated prior to Nov. 1, 2012 (admitted prior art).

* cited by examiner

*Primary Examiner* — Thomas R. Hannon
(74) *Attorney, Agent, or Firm* — Volpe and Koenig P.C.

(57) ABSTRACT

A tandem rolling bearing including a first rolling element subassembly and a second rolling element subassembly is provided. The subassemblies both include a plurality of rolling elements and a cage. The cages each include a ring and a plurality of axial projections having axial free ends. The free ends of the cages in the first and second subassemblies face each other. Rolling element retaining pockets are defined between adjacent pairs of projections in the cages. The projections include pairs of lugs that, together with a partially spherical retaining surface provided between the projections of each of the pockets, contact and retain the rolling elements in the pockets.

15 Claims, 7 Drawing Sheets

TANDEM ROLLING BEARINGS WITH OPEN CAGE

CROSS REFERENCE TO RELATED APPLICATION

This application claims the benefit of U.S. Provisional Application No. 61/727,258, filed Nov. 16, 2012, which is incorporated herein by reference as if fully set forth.

FIELD OF INVENTION

This application is generally related to rolling bearings and more particularly related to tandem ball bearings.

BACKGROUND

Rolling bearings are widely used in various mechanical applications, including the automotive field. Tandem rolling bearings include two rows of rolling elements. The two rows are arranged in a stepped-manner, axially offset in relation to one another. These rows generally include cages for retaining and separating the rolling elements in the circumferential direction. A subset of this is tandem ball bearings where the rolling elements are balls. Tandem ball bearing assemblies can include a small and large rolling element subassembly. Each subassembly includes a cage and a plurality of the rolling elements. Retention of the rolling element subassemblies depends on the diametrical interference between the retention diameter of the smaller rolling element subassembly, defined as the diameter formed on the radially inner surface of the rolling elements, and the diameter of a retention element formed on an axial end of the inner ring. Slight deviations of the retention diameter of the smaller rolling element subassembly, due to geometric tolerances, moisture absorption, and/or thermal expansion, can cause excessive or inadequate retention of the smaller rolling element subassembly on the inner ring.

Cages for separating rolling elements are typically made from plastic in an injection-molding process. U.S. Patent Application 2010/0189386 A1 discloses an angular-contact ball bearing in a tandem arrangement. The two main types of cages currently used in rolling bearing assemblies are closed and open. Closed cages retain rolling elements in the circumferential direction and both axial directions. When installed in a bearing assembly, the rolling elements arranged in a closed cage are retained about a given axis by either the cage or the races of the rings. U.S. Pat. No. 6,783,279 B2 discloses a closed cage tandem rolling bearing where closed cages retain the rolling elements. These closed cages require additional space between the rolling element subassemblies to maintain necessary clearance during operation. Because of their configuration, closed cages are often stiffer than similarly sized open cages. As a result, closed cages are more sensitive with respect to their retention properties than open cages, and the retention forces provided by closed cages are greater than open cages.

Open cages separate rolling elements in the circumferential direction and retain the rolling elements on one axial side. U.S. Patent Application 2010/0296761 A1 discloses an open cage tandem rolling bearing. These open cages do not retain rolling elements in the outer radial direction and both axial directions.

Providing retention of the rolling elements in the outer radial direction as well as in the axial directions would be desirable during installation of cage subassemblies onto an inner ring of a bearing assembly.

It would also be desirable to retain the rolling elements in the cages during the installation of the subassemblies onto the outer ring. After the rolling element subassemblies are secured on the inner ring, this inner ring subassembly is dropped a short distance down a shaft with the smaller rolling element subassembly facing down. The inner ring subassembly comes to rest at an intermediate position before being pressed into position with the outer ring. Retention of the smaller rolling element subassembly on the seat of the smaller race of the inner ring during installation is necessary.

Therefore, a need exists for a tandem rolling bearing having the advantages of both the open and closed cages. A need exists for a cage for a tandem rolling bearing that does not have the increased width requirements or stiffness provided by the closed cages that still provides improved retention of the rolling elements during assembly.

SUMMARY

A tandem rolling bearing is disclosed including an inner and outer bearing ring each defining at least two races. A first rolling element subassembly includes a first plurality of rolling elements and a first cage, and is located in a first pair of the races in the inner and outer bearing rings. The first cage includes a first ring having a plurality of axially extending projections each having an axial free end and rolling element retaining pockets defined between each adjacent pair of the projections. Each of the projections includes a pair of radially outer lugs extending in a circumferential direction into adjacent ones of the pockets. The radially outer lugs that extend from adjacent ones of the projections into each of the pockets define a radially outer retaining surface for a respective one of the first plurality of rolling elements in the respective pocket. Radially inner partially cylindrical surfaces are located between the projections of each of the pockets and contact a respective one of the first plurality of rolling elements. A second rolling element subassembly includes a second plurality of rolling elements and a second cage, and is located in a second pair of the races in the inner and outer bearing rings. The second cage includes a second ring having a plurality of axially extending projections each having an axial free end and rolling element retaining pockets defined between each adjacent pair of the projections. Each of the projections includes a pair of radially inner lugs extending in the circumferential direction into adjacent ones of the pockets. The radially inner lugs that extend from adjacent ones of the projections into each of the pockets define a radially inner retaining surface for a respective one of the second plurality of rolling elements in the respective pocket. Radially outer partially cylindrical surfaces are located between the projections of each of the pockets and contact a respective one of the second plurality of rolling elements. The free ends of the projections of the first and second cages face one another.

DETAILED DESCRIPTION OF THE PREFERRED EMBODIMENTS

Figure 1:
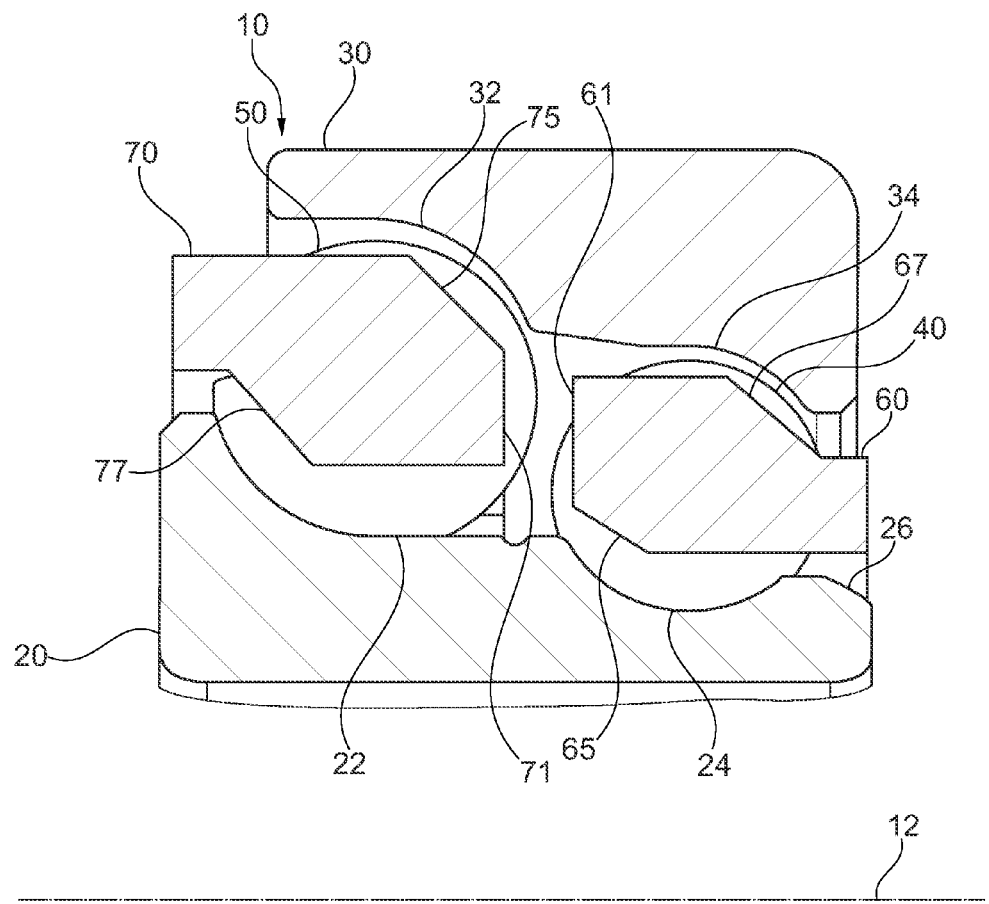
FIG. 1 is a cross-sectional view of a tandem rolling bearing according to the invention.

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivates thereof, and words of similar import.

FIG. 1 shows a preferred embodiment of the tandem rolling bearing 10 according to the present invention. The tandem rolling bearing 10 includes an inner ring 20 arranged coaxial with an outer ring 30. The inner and outer rings 20, 30 each define at least two races 22, 24, 32, 34 for supporting the rolling elements 40, 50 in the radial direction. Pluralities of rolling elements 40, 50 are arranged between the inner and outer rings 20, 30 to support the rings 20, 30 during rotation. The rolling elements 40, 50 are preferably balls, and the bearing is preferably a tandem ball bearing. First and second cages 60, 70 provide circumferential spacers for the pluralities of rolling elements 40, 50. During assembly, the pluralities of rolling elements 40, 50 are inserted into the cages 60, 70 in the radial direction. Processes for forming the inner and outer rings 20, 30 are well known. The inner and outer rings 20, 30 can be made from any suitable material having the desired hardness and load bearing characteristics, such as, for example and without limitation, through hardened or case hardened steel.

Figure 2:
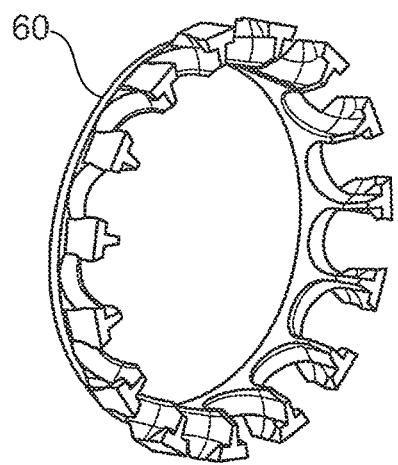
FIGS. 2-4 are perspective views of one of a first cage and a first rolling element subassembly.
Figure 3:
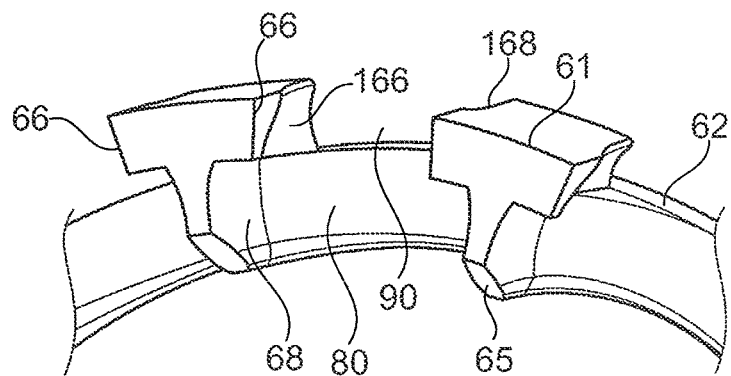
Figure 4:
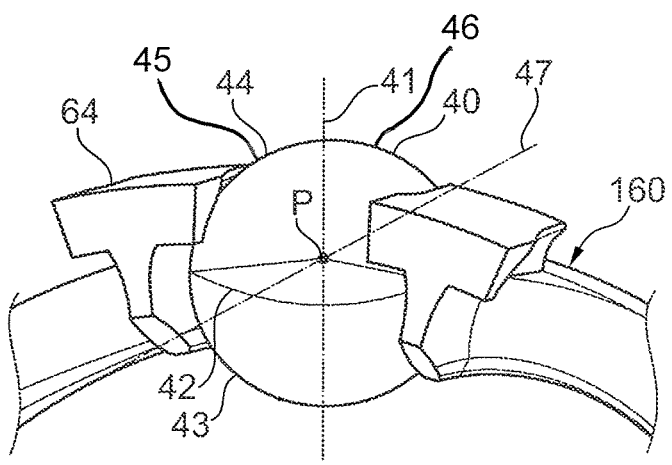

Two rolling element subassemblies 160, 170 are provided. FIG. 4 shows a first rolling element subassembly 160 including one of the rolling elements of the first plurality of rolling elements 40 and the first cage 60. When the tandem rolling bearing 10 is assembled, the first cage 60 is located in a first pair of the races 24, 34 in the inner and outer rings 20, 30. FIGS. 2-4 show the first cage 60 comprises a first ring 62 having a plurality of axially extending projections 64 each having an axial free end 61. Rolling element retaining pockets 90 are defined between each adjacent pair of axially extending projections 64. Each of the projections 64 includes a pair of radially outer lugs 66 that extend in a circumferential direction into adjacent ones of the rolling element retaining pockets 90. The radially outer lugs 66 that extend from adjacent ones of the projections 64 into each of the pockets 90 define radially outer retaining surfaces 166, 168 for a respective one of the first plurality of rolling elements 40 in the respective pocket 90. The outer retaining surfaces 166, 168 are preferably adapted to a contact area of the rolling elements 40, and in the preferred construction are partial spherical surfaces. Radially inner partially cylindrical surfaces 68 are located on the projections 64 radially inwardly from the outer lugs 66 of each of the pockets 90. A partially spherical surface 80 formed on an inner wall of the first ring 62 forms a radially inner support for the rolling element 40 and includes a smooth transition to the radially inner partially cylindrical surfaces 68. The first cage 60 is preferably integrally formed as a unitary part from plastic.

Figure 5:
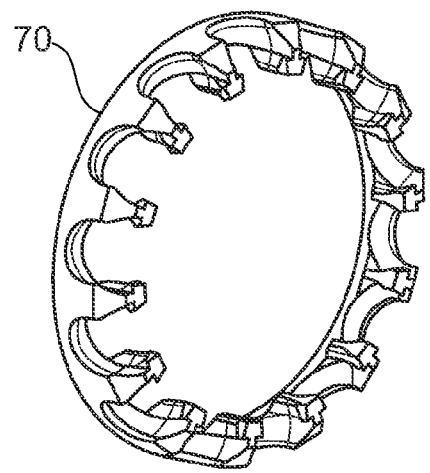
FIGS. 5-7 are perspective views of one of a second cage and a second rolling element subassembly.
Figure 6:
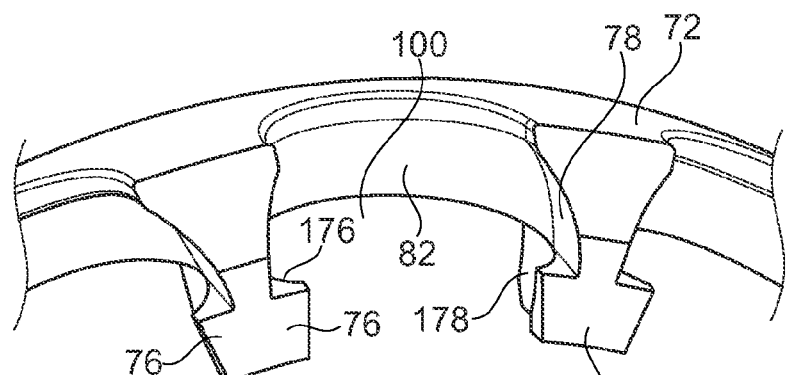
Figure 7:
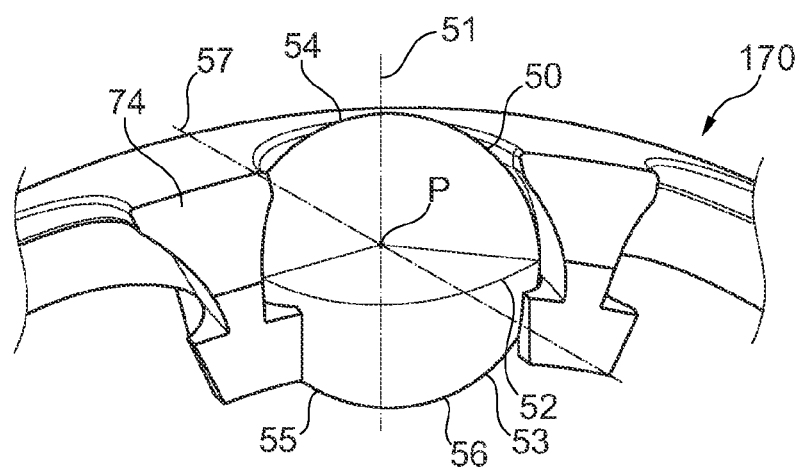
Figure 8:
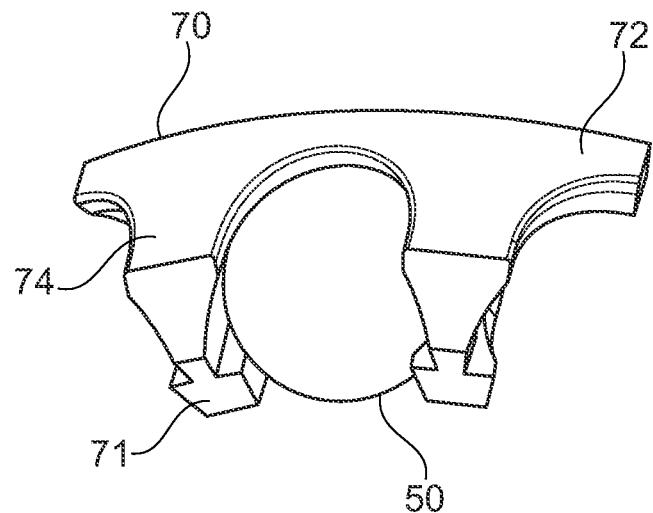
FIG. 8 is a perspective view of the second cage.
Figure 9:
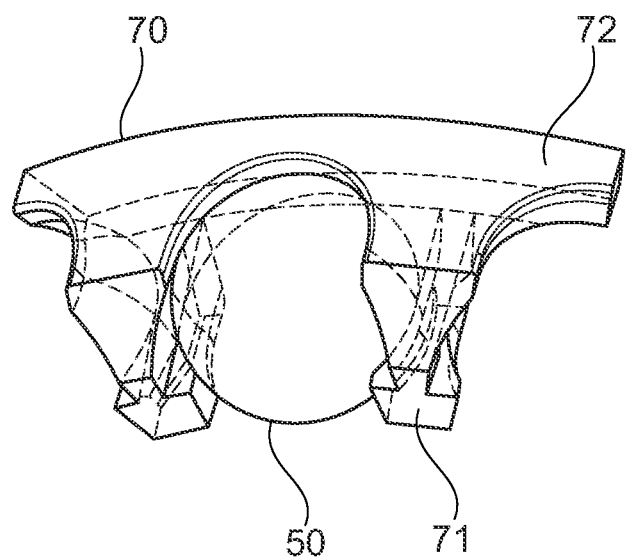
FIG. 9 is a perspective view of the second cage with hidden lines shown.

FIGS. 7-9 show a second rolling element subassembly 170 including one of the rolling elements of the second plurality of rolling elements 50 and the second cage 70. The second rolling element subassembly 170 has a larger overall diameter than an overall diameter of the first rolling element subassembly 160. When the tandem rolling bearing 10 is assembled, the second cage 70 is located in a second pair of the races 22, 32 in the inner and outer rings 20, 30. FIGS. 5-7 show the second cage 70 comprises a second ring 72 having a plurality of axially extending projections 74 each having an axial free end 71. Rolling element retaining pockets 100 are defined between each adjacent pair of the projections 74. Each of the projections 74 includes a pair of radially inner lugs 76 extending in the circumferential direction into adjacent ones of the pockets 100. The radially inner lugs 76 that extend from adjacent ones of the projections 74 into each of the pockets 100 define radially inner retaining surfaces 176, 178 for a respective one of the second plurality of rolling elements 50 in the respective pocket 100. The inner retaining surfaces 176, 178 are preferably adapted to a contact area of the rolling elements 50, and in the preferred construction are partial spherical surfaces. Radially outer partially cylindrical surfaces 78 are located on the projections 74 radially outwardly from the inner lugs 76 of each of the pockets 100. A partially spherical surface 82 formed on an inner wall of the second ring 72 forms a radially outer support for the rolling element 50 and includes a smooth transition to the radially outer partially cylindrical surfaces 78. The second cage 70 is preferably integrally formed as a unitary part from plastic.

The axial free ends 61, 71 of the projections 64, 74 of the first and second cages 60, 70 face each other. The rolling element subassemblies 160, 170 of the present tandem rolling bearing 10 can be arranged closer to each other than closed cage tandem rolling bearings, which require additional clearance space between rolling element subassemblies due to the closed cage configuration. Due to the open cage configuration of the cages 60, 70 of the invention, the shortest distance between the first plurality of rolling elements 40 and the second plurality of rolling elements 50 can be reduced.

In the preferred embodiment of a tandem ball bearing, the first and second plurality of rolling elements 40, 50 comprise spherical rolling elements, each located on a radial axis 41, 51 that extends through an axial center 12 of the tandem rolling bearing 10, and having an equator 42, 52 that is perpendicular to the radial axis 41, 51 that divides the spherical rolling elements into radially inner hemispheres 43, 53 and radially outer hemispheres 44, 54. The pluralities of spherical rolling elements 40, 50 each have a center point P which the radial axes 41, 51 extend through. The equators 42, 52 define a plane that is perpendicular to the radial axes 41, 51. An axial axis 47, 57 extends through the center point P and is parallel and radially offset from the axial center 12 of the tandem rolling bearing 10.

Figure 12:
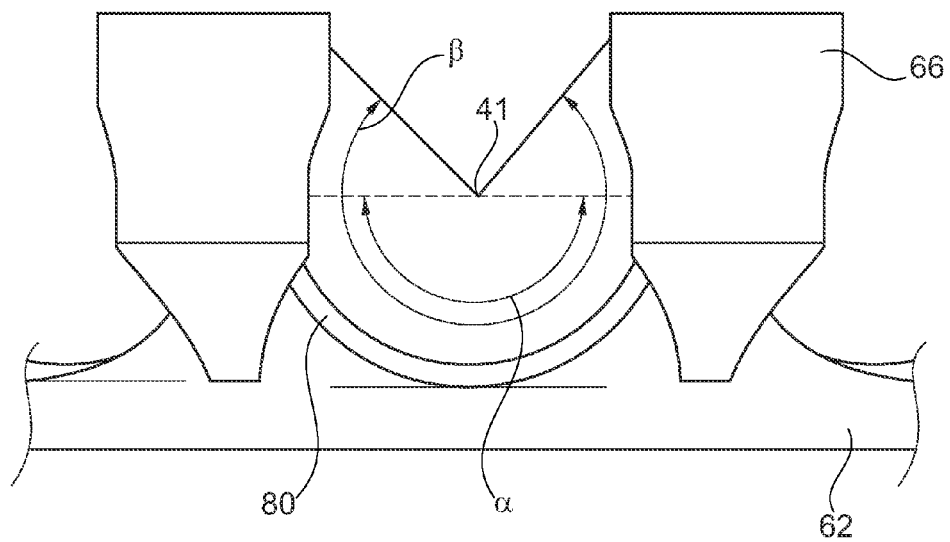
FIG. 12 is a top planar view of the first cage.
Figure 13:
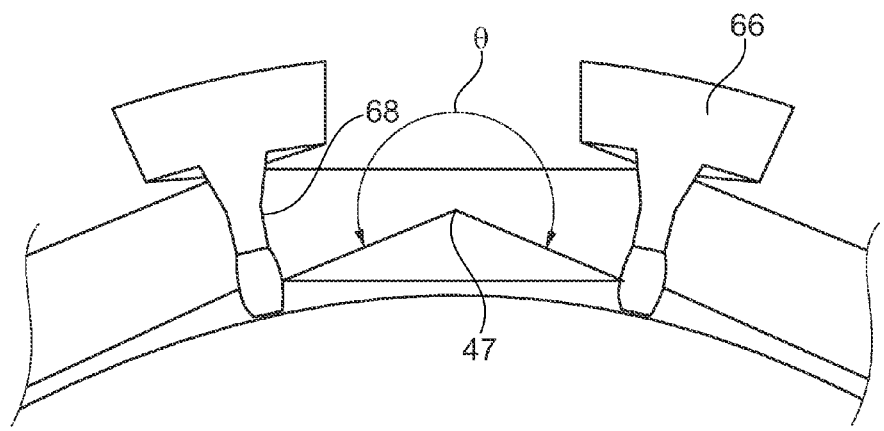
FIG. 13 is a front view of the first cage.

In order to provide good retention properties with the open cage configuration, the radially outer lugs 66 of the first cage 60 contact two quadrants 45, 46 of the radially outer hemisphere 44 of each of the first plurality of spherical rolling elements 40 adjacent to the axial free ends 61 of the projections 64, and the partially spherical surface 80 of the first cage 60 and/or the partially cylindrical surfaces 68 contacts the radially inner hemisphere 43. The partially spherical surface 80 extends about the radial axis 41 of the first plurality of spherical rolling elements 40. As shown in FIG. 12, angle α is defined by the partially spherical surface 80 extending about the radial axis 41. Angle α is preferably in the range of 170°-190°. Angle β is partially defined by the outer retaining surfaces 166, 168 and is preferably approximately 260°-270° about the radial axis 41. FIG. 13 shows angle θ is partially defined by the radially inner partially cylindrical surfaces 68 and is preferably approximately 225°-255° about the axial axis 47.

Figure 14:
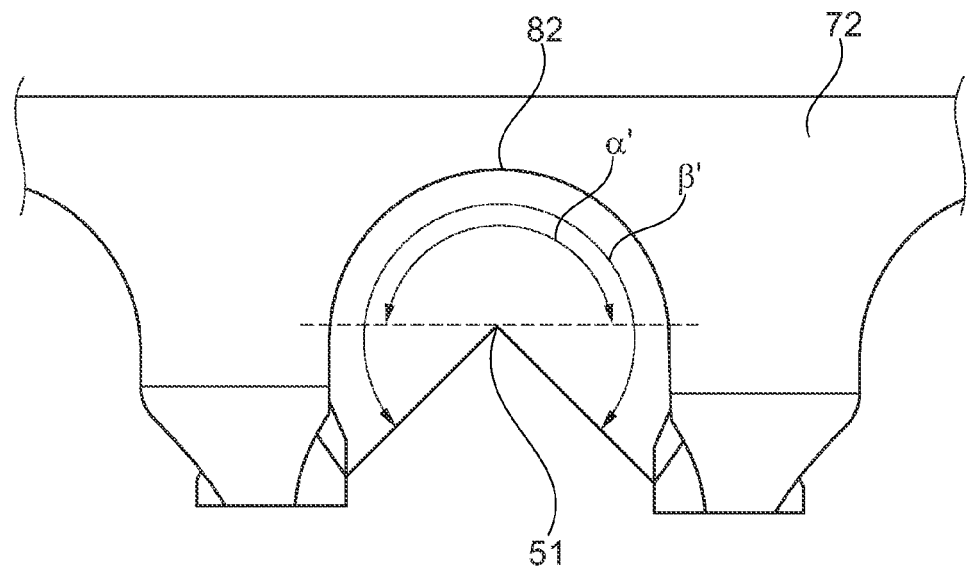
FIG. 14 is a top planar view of the second cage.
Figure 15:
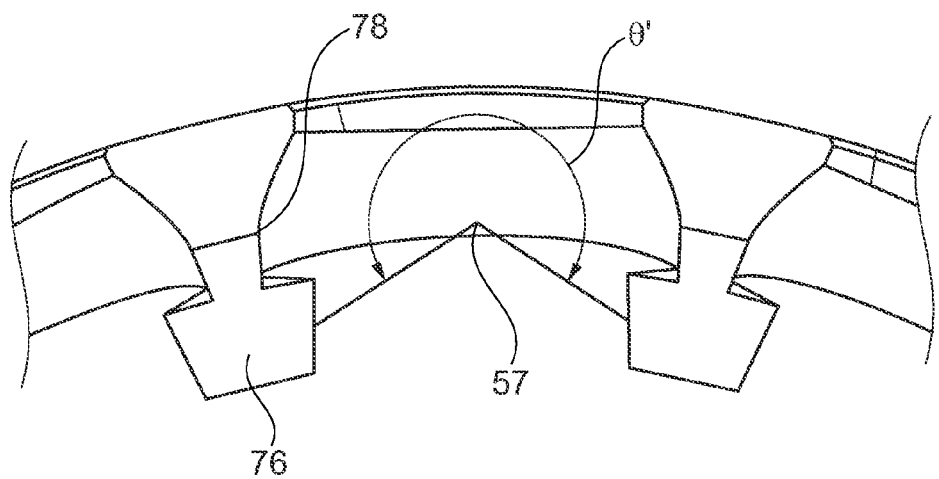
FIG. 15 is a front view of the second cage.

For the second cage 70, the radially inner lugs 76 contact two quadrants 55, 56 of the radially inner hemisphere 53 of each of the second plurality of spherical rolling elements 50 adjacent to the axial free ends 71 of the projections 74, and the partially spherical surface 82 of the second cage 70 and/or the partially cylindrical surfaces 78 contacts the radially outer hemisphere 54. The partially spherical surface 82 extends about the radial axis 51 of the second plurality of spherical rolling elements 50. As shown in FIG. 14, angle α' is defined by the partially spherical surface 82 extending about the radial axis 51. Angle α' is preferably in the range of 170°-190°. Angle "β" is partially defined by the inner retaining surfaces 176, 178 and is preferably approximately 260°-270° about the radial axis 51. FIG. 15 shows angle θ' is partially defined by the radially outer partially cylindrical surfaces 78 and is preferably approximately 225°-255° about the axial axis 57.

Figure 10:
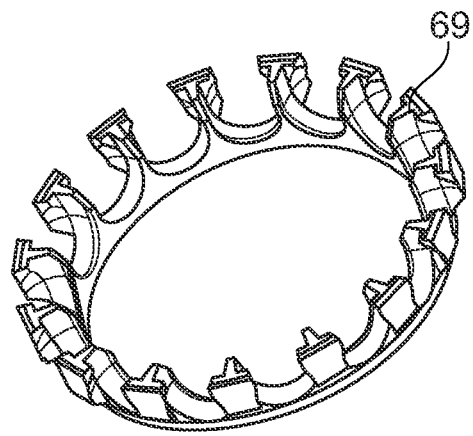
FIG. 10 is a perspective view of an alternative embodiment of the first cage.

Preferably, the projections 64 of the first cage 60 each include a first chamfered portion 65 on a radially inner surface adjacent to the axial free end 61. The projections 64 of the first cage 60 preferably each also include a second chamfered portion 67 on a radially outer surface adjacent to the first ring 62. FIG. 10 shows each projection 64 of the first cage 60 can also include a third chamfered portion 69 on the radially outer surface adjacent to the axial free end 61.

Figure 11:
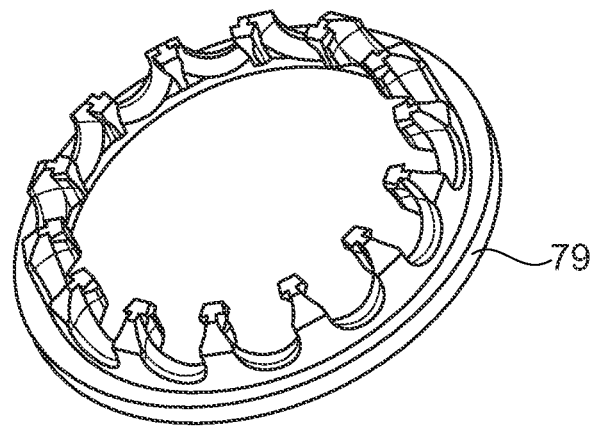
FIG. 11 is a perspective view of an alternative embodiment of the second cage.

In a similar manner, preferably, the projections 74 of the second cage 70 each include a first chamfered portion 75 on a radially outer surface adjacent to the axial free end 71. The projections 74 of the second cage 70 preferably each also include a second chamfered portion 77 on a radially inner surface adjacent to the second ring 72. As shown in FIG. 11, the second ring 72 can include a radially extending rib 79 that extends radially outward beyond the projections 74 of the second cage 70.

Referring again to FIG. 1, the inner ring 20 includes a retention element 26 on an axial end. The retention element 26 is an annular rib with a greater diameter than the adjacent race 24. The smaller rolling element subassembly 160 has a smaller retention diameter than the diameter of the retention element 26 of the inner ring 20. The smaller rolling element subassembly 160 is pressed into the race 24 over the retention element 26 and is held secure in position by the retention element 26.

Having thus described various embodiments of the present tandem rolling bearing in detail, it is to be appreciated and will be apparent to those skilled in the art that many physical changes, only a few of which are exemplified in the detailed description above, could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A tandem rolling bearing comprising:
an inner and outer bearing ring each defining at least two races;
a first rolling element subassembly including a first plurality of rolling elements and a first cage located in a first pair of the races in the inner and outer bearing rings,
wherein the first cage comprises a first ring having a plurality of axially extending projections each having an axial free end and rolling element retaining pockets defined between each adjacent pair of the projections,
each of the projections includes a pair of radially outer lugs extending in a circumferential direction into adjacent ones of the pockets, the radially outer lugs that extend from adjacent ones of the projections into each of the pockets define a radially outer retaining surface for a respective one of the first plurality of rolling elements in the respective pocket, a partially spherical surface on an inner surface of the first ring, and respective radially inner partially cylindrical surfaces located between the projections of each of the pockets contact a respective one of the first plurality of rolling elements; and
a second rolling element subassembly including a second plurality of rolling elements and a second cage located in a second pair of the races in the inner and outer bearing rings,
wherein the second cage comprises a second ring having a plurality of axially extending projections each having an axial free end and rolling element retaining pockets defined between each adjacent pair of the projections,
each of the projections includes a pair of radially inner lugs extending in the circumferential direction into adjacent ones of the pockets, the radially inner lugs that extend from adjacent ones of the projections into each of the pockets define a radially inner retaining surface for a respective one of the second plurality of rolling elements in the respective pocket, a partially spherical surface on an inner surface of the second ring, and respective radially outer partially cylindrical surfaces located between the projections of each of the pockets contact a respective one of the second plurality of rolling elements, and
the free ends of the projections of the first and second cages face one another.

2. The tandem rolling bearing of claim 1, wherein the first and second plurality of rolling elements comprise spherical rolling elements each having a radial axis that extends though an axial center of the tandem rolling bearing, an axial axis that extends parallel and radially offset from the axial center of the tandem rolling bearing, and an equator that is perpendicular to the radial axis divides the spherical rolling elements into radially inner and outer hemispheres.

3. The tandem rolling bearing of claim 2, wherein the radially outer lugs of the first cage contact two quadrants of the radially outer hemisphere of each of the first plurality of spherical rolling elements adjacent to the free ends of the projections.

4. The tandem rolling bearing of claim 3, wherein the partially spherical surface of the first cage contacts the radially inner hemisphere and extends approximately 170-190° about the radial axis of each of the first plurality of spherical rolling elements.

5. The tandem rolling bearing of claim 2, wherein the radially inner lugs of the second cage contact two quadrants of the radially inner hemisphere of each of the second plurality of spherical rolling elements adjacent to the free ends of the projections.

6. The tandem rolling bearing of claim 5, wherein the partially spherical surface of the second cage contacts the radially outer hemisphere and extends approximately 170-190° about the radial axis of each of the second plurality of spherical rolling elements.

7. The tandem rolling bearing of claim 1, wherein the second rolling element subassembly has a larger overall diameter than an overall diameter of the first rolling element subassembly.

8. The tandem rolling bearing of claim 1, wherein the first cage is integrally formed as a unitary part from plastic.

9. The tandem rolling bearing of claim 1, wherein the second cage is integrally formed as a unitary part from plastic.

10. The tandem rolling bearing of claim 1, wherein the projections of the second cage include a first chamfered portion on a radially outer surface adjacent to the axial free ends.

11. The tandem rolling bearing of claim 10, wherein the projections of the second cage include a second chamfered portion on a radially inner surface adjacent to the second ring.

12. The tandem rolling bearing of claim 11, wherein the projections of the first cage include a third chamfered portion on the radially outer surface adjacent to the axial free ends.

13. The tandem rolling bearing of claim 1, wherein the projections of the first cage include a first chamfered portion on a radially inner surface adjacent to the axial free ends.

14. The tandem rolling bearing of claim 13, wherein the projections of the first cage include a second chamfered portion on a radially outer surface adjacent to the first ring.

15. The tandem rolling bearing of claim 1, wherein the second ring includes a radially extending rib that extends radially outward beyond the projections of the second cage.

\* \* \* \* \*